US009676498B1

(12) United States Patent
Hand

(10) Patent No.: US 9,676,498 B1
(45) Date of Patent: Jun. 13, 2017

(54) MULTI-STAGE SPACE LAUNCH SYSTEMS WITH REUSABLE THRUST AUGMENTATION AND ASSOCIATED METHODS

(71) Applicant: The Boeing Company, Chicago, IL (US)

(72) Inventor: Michael Leslie Hand, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/236,239

(22) Filed: Aug. 12, 2016

Related U.S. Application Data

(63) Continuation of application No. 14/219,818, filed on Mar. 19, 2014, now Pat. No. 9,457,918.

(51) Int. Cl.
| | | |
|---|---|---|
| *B64G 1/00* | (2006.01) | |
| *B64G 1/64* | (2006.01) | |
| *B64G 1/58* | (2006.01) | |
| *B64G 5/00* | (2006.01) | |
| *B64G 1/62* | (2006.01) | |

(52) U.S. Cl.
CPC ............... *B64G 1/002* (2013.01); *B64G 1/58* (2013.01); *B64G 1/62* (2013.01); *B64G 1/641* (2013.01); *B64G 1/645* (2013.01); *B64G 5/00* (2013.01)

(58) Field of Classification Search
CPC .......... B64G 1/005; B64G 1/002; B64G 1/64; B64G 1/40; B64G 1/401; B64G 1/62
See application file for complete search history.

(56) References Cited

U.S. PATENT DOCUMENTS

| | | |
|---|---|---|
| 3,013,747 A | 12/1961 | Grihangne et al. |
| 4,723,736 A | 2/1988 | Rider |
| 4,834,324 A | 5/1989 | Criswell |
| 4,964,340 A | 10/1990 | Daniels et al. |
| 5,031,857 A | 7/1991 | MacConochie et al. |
| 5,667,167 A | 9/1997 | Kistler |
| 6,454,216 B1 | 9/2002 | Kiselev et al. |
| 6,616,092 B1 | 9/2003 | Barnes et al. |
| 7,036,773 B2 | 5/2006 | Caldwell |
| 7,226,017 B2 | 6/2007 | Blevio, Sr. |

(Continued)

OTHER PUBLICATIONS

Webpage for entry "DC-X" on Encyclopedia Astronautica at astronautix.com/lvs/dcx.htm, downloaded on Mar. 10, 2014.

(Continued)

*Primary Examiner* — Philip J Bonzell
*Assistant Examiner* — Michael Kreiner
(74) *Attorney, Agent, or Firm* — DASCENZO Intellectual Property Law, P.C.

(57) ABSTRACT

Systems and methods for launching space vehicles into outer space are disclosed. Method include powering a thrust augmentation stage of a launch vehicle during an initial portion of a launch trajectory to provide thrust to the launch vehicle; following the initial portion of the launch trajectory, separating a first stage of the launch vehicle from the thrust augmentation stage; powering the first stage of the launch vehicle during the initial portion and during a second portion of the launch trajectory following the initial portion of the launch trajectory to provide thrust to the launch vehicle; and controlling a controlled descent of the thrust augmentation stage to Earth following separation of the thrust augmentation stage from the first stage.

39 Claims, 5 Drawing Sheets

(56) References Cited

U.S. PATENT DOCUMENTS

| | | |
|---|---|---|
| 8,498,756 B1 | 7/2013 | Sarver |
| 8,678,321 B2 | 3/2014 | Bezos et al. |
| 8,844,876 B2 | 9/2014 | Prampolini |
| 8,960,590 B2 | 2/2015 | Rutan |
| 9,033,276 B1 | 5/2015 | Calvert |
| 9,073,647 B2 | 7/2015 | Helou, Jr. |
| 9,174,749 B2 | 11/2015 | Prampolini et al. |
| 2015/0048212 A1 | 2/2015 | Fricker et al. |
| 2015/0375875 A1 | 12/2015 | Dula |

OTHER PUBLICATIONS

Webpage for entry "McDonnell Douglas DC-X" on Wikipedia at en.wikipedia.org/wiki/McDonnell_Douglas_DC-X, downloaded on Mar. 10, 2014.

Delta IV Launch Services User's Guide, United Launch Alliance, Jun. 2013.

MULTI-STAGE SPACE LAUNCH SYSTEMS WITH REUSABLE THRUST AUGMENTATION AND ASSOCIATED METHODS

RELATED APPLICATION

The present application is a continuation of and claims priority to U.S. patent application Ser. No. 14/219,818, filed on Mar. 19, 2014 and entitled "MULTI-STAGE SPACE LAUNCH SYSTEMS WITH REUSABLE THRUST AUGMENTATION AND ASSOCIATED METHODS," the complete disclosure of which is incorporated herein by reference.

FIELD

The present disclosure relates to multi-stage space launch systems.

BACKGROUND

Historically, space launch systems have used varying numbers of strap-on solid rocket boosters to provide additional thrust to a multi-stage launch vehicle during an initial portion of a launch trajectory. Even though it may be possible to reuse solid rocket boosters in various circumstances, they typically are difficult and expensive to retrieve and reuse following a launch. Moreover the cost of such solid rocket boosters often is a significant portion of the overall cost associated with placing a space vehicle into outer space.

SUMMARY

Multi-stage space launch systems and methods for launching space vehicles into outer space are disclosed herein.

Systems include a launch vehicle configured to operatively support a space vehicle for placement in outer space. The launch vehicle includes at least two stages, including a thrust augmentation stage configured to provide thrust for launching the space vehicle during an initial portion of a launch trajectory, and a first stage configured to be selectively coupled to and decoupled from the thrust augmentation stage and further configured to provide thrust for launching the space vehicle during both the initial portion of the launch trajectory and during a second portion of the launch trajectory following the initial portion of the launch trajectory. The thrust augmentation stage is configured to be selectively decoupled from the first stage during the launch trajectory and subsequently to be retrieved and reused following a launch of the launch vehicle. In some systems, the thrust augmentation stage may be described as a short-range thrust augmentation stage.

Methods include powering a thrust augmentation stage of a launch vehicle during an initial portion of a launch trajectory to provide thrust to the launch vehicle; following the initial portion of the launch trajectory, separating a first stage of the launch vehicle from the thrust augmentation stage; powering the first stage of the launch vehicle during the initial portion and during a second portion of the launch trajectory following the initial portion of the launch trajectory to provide thrust to the launch vehicle; and controlling a controlled descent of the thrust augmentation stage to Earth following separation of the thrust augmentation stage from the first stage. In some methods, the initial portion of the separating of the first stage from the thrust augmentation stage may be at a relatively low elevation. In some methods, the controlling the controlled descent may result in the thrust augmentation stage landing at the launch facility from which the launch vehicle initially launched.

DESCRIPTION

Figure 1:
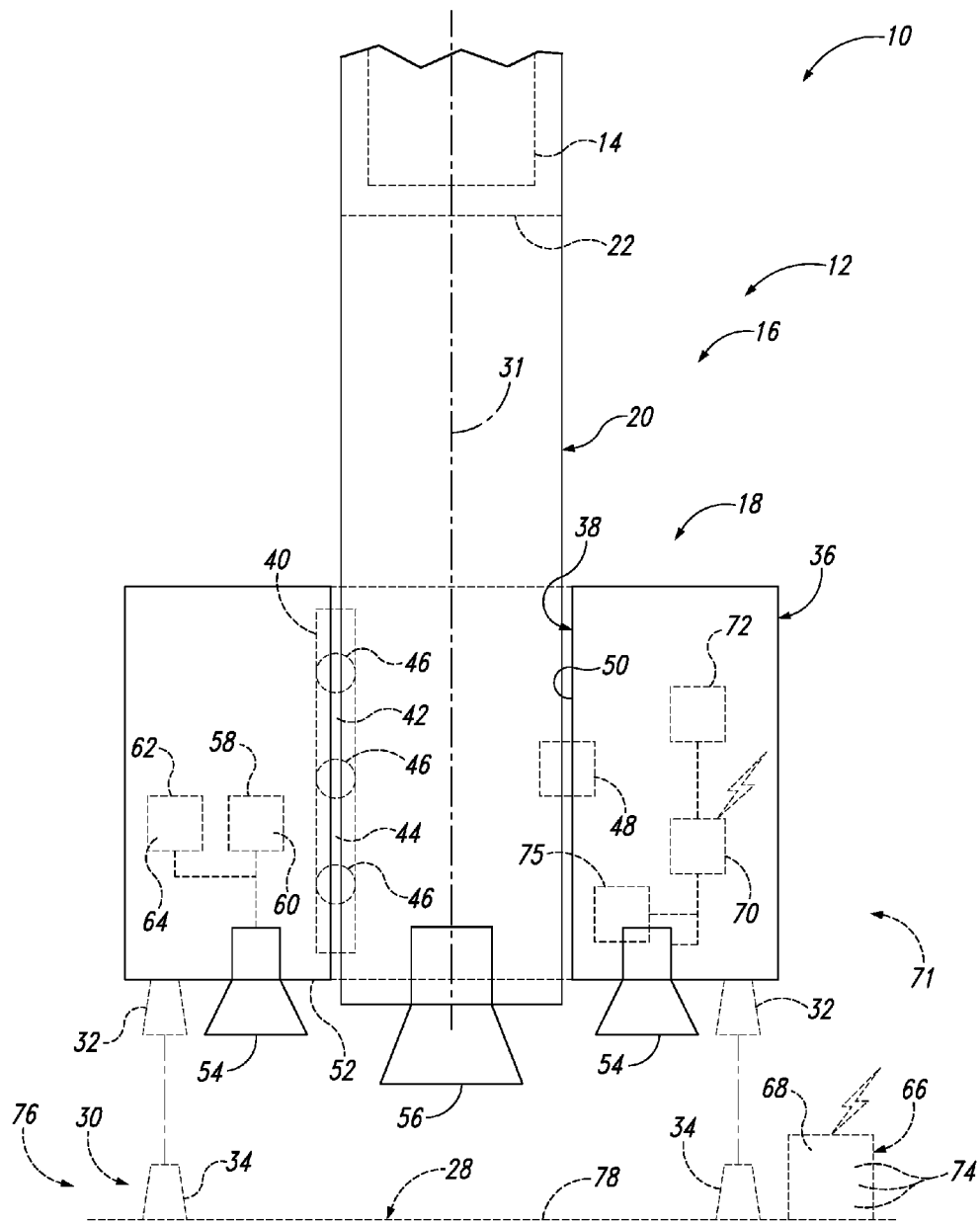
FIG. 1 is a schematic diagram representing multi-stage space launch systems.
Figure 3:
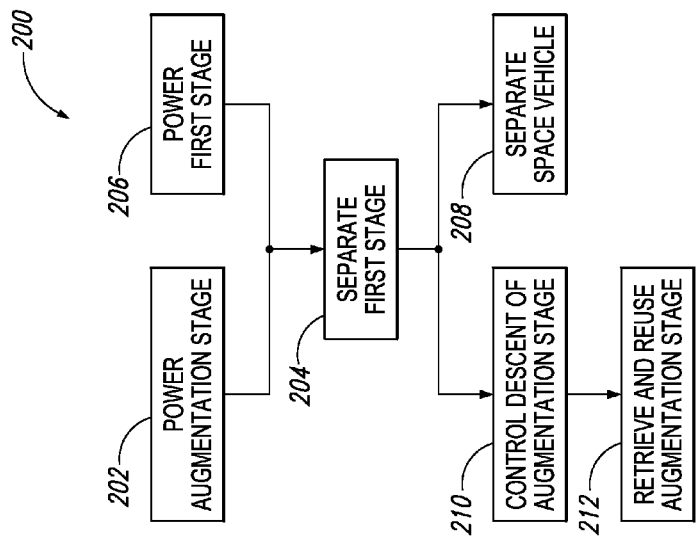
FIG. 3 is a flowchart schematically representing methods of launching a space vehicle into outer space.
Figure 2:
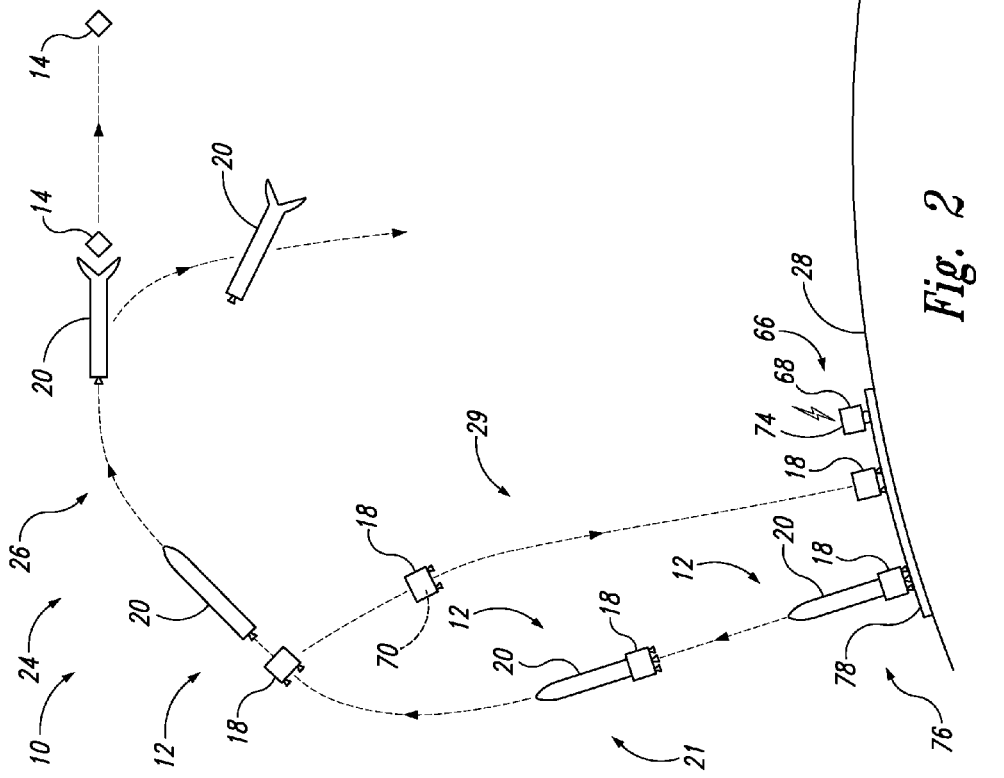
FIG. 2 is another schematic diagram representing multi-stage launch systems.

Multi-stage space launch systems and methods are disclosed herein. FIGS. 1-2 schematically represent illustrative, non-exclusive examples of multi-stage space lunch systems 10 according to the present disclosure, and FIG. 3 schematically represents illustrative, non-exclusive examples of methods 200 for launching space vehicles into outer space according to the present disclosure. In general, in FIG. 1, elements that are likely to be included within an example of a system 10 are illustrated schematically in solid lines, while elements that may be optional are illustrated schematically in dashed lines. Moreover, the methods and steps schematically represented in the flowchart of FIG. 3 are not limiting and other methods and steps are within the scope of the present disclosure, including methods having greater than or fewer than the number of steps illustrated, as understood from the discussions herein. Additionally, the illustrated steps are not required to be performed in the order illustrated in all methods according to the present disclosure. FIGS. 4-8 illustrate, somewhat less schematically, an illustrative, non-exclusive example of a multi-stage space launch system according to the present disclosure.

Turning first to FIG. 1, as schematically illustrated, a multi-stage space launch system 10 includes at least a launch vehicle 12 that is configured to operatively support a space vehicle 14 for placement in outer space. The launch vehicle includes at least two stages 16 including a thrust augmentation stage 18 and a first stage 20 that is configured to be selectively coupled to and decoupled from the thrust augmentation stage; however, as schematically and optionally represented in FIG. 1, a launch vehicle may include more than two stages, including an optional second stage 22 that is configured to be selectively coupled to and decoupled from the first stage, and so forth. Any suitable number of stages may be incorporated into a launch vehicle 12, including more than three stages, for example, depending on the mass of the space vehicle 14, an orbit in which the space vehicle is to be placed by a system 10, and/or whether or not the space vehicle is to remain in an orbit of Earth or be launched beyond Earth. Illustrative, non-exclusive examples of space vehicles include man-made satellites, such as communication or other types of satellites, inter-planet space vehicles, interstellar space vehicles, including unmanned space vehicles as well as manned space vehicles.

With reference to FIG. 2, the thrust augmentation stage 18 of a launch vehicle 12 is configured to augment the thrust of the first stage 20 for launching the space vehicle during at least an initial portion 21 of a launch trajectory 24. The first stage 20 of a launch vehicle 12 is configured to provide thrust for launching the space vehicle during the initial portion 21 of the launch trajectory, as well as during a second portion 26 of the launch trajectory following the initial portion of the launch trajectory. In other words, the thrust augmentation stage and the first stage both provide thrust during the initial portion of a launch, and the first stage continues to provide thrust during the launch trajectory following the thrust augmentation stage, that is, during a second portion 26. Stated differently, in examples of launch vehicles that utilize stages having combustion based engines, or rockets, the engines associated with both the thrust augmentation stage and the first stage may be lit on the ground, that is, at the initiation of a launch, so that both the thrust augmentation stage and the first stage provide thrust to the launch vehicle during the initial portion of the launch trajectory.

Any suitable length of the initial portion 21 of the launch trajectory 24 is within the scope of the present disclosure. As discussed herein, some thrust augmentation stages 18 may be described as short-range thrust augmentation stages, due to their optional landing within the vicinity of a position from which the launch vehicle was launched. As illustrative, non-exclusive examples of short-range thrust augmentation stages, the initial portion of a launch trajectory may extend to a maximum elevation of one of 10, 20, 30, 40, or 50 kilometers. Additionally or alternatively, the initial portion of a launch trajectory may last for no more than 40, 50, 60, 70, 80, 90, or 100 seconds after liftoff of the launch vehicle. Additionally or alternatively, an initial portion of a launch trajectory may last until the launch vehicle reaches a speed of no more than Mach 2, Mach 3, Mach 4, or Mach 5.

As illustrative, non-exclusive examples only, the first stage 20 and optional second, third, and so forth stages 16 may correspond to and/or be adapted directly from existing space launch systems, such as the various Delta and Atlas space launch systems. That is, the first stage of such existing space launch systems may be adapted to become the first stage 20 of a system 10 according to the present disclosure, and thus configured to be used with a thrust augmentation stage according to the present disclosure.

Some embodiments of thrust augmentation stage 18 may be described as being reusable. For example, a thrust augmentation stage 18 may be configured to be selectively decoupled from the first stage 20 during the launch trajectory and subsequently retrieved and reused following a launch of a launch vehicle that includes the thrust augmentation stage. In some such embodiments, the thrust augmentation stage 18 may be configured to be selectively decoupled from the first stage during the launch trajectory and subsequently retrieved and reused with a distinct first stage to define a distinct launch vehicle for a subsequent launch of a distinct space vehicle into outer space. Additionally or alternatively, a thrust augmentation stage 18 may be configured to land on Earth following a launch, for example without significant, if any, damage to the thrust augmentation stage 18. This optional configuration of a thrust augmentation stage is schematically illustrated in FIG. 2, with the thrust augmentation stage 18 separating from the first stage at the transition from the initial portion 21 to the second portion 26 of the launch trajectory 24, and with the thrust augmentation stage returning to and landing on Earth 28.

In some embodiments, the thrust augmentation stage 18 may be configured to land on Earth with the same orientation as the thrust augmentation stage was launched, for example, in a vertical orientation. In some embodiments, the thrust augmentation stage 18 may be configured to utilize the same source of thrust that is used during the initial portion 21 of the launch trajectory 24 to return to and land on Earth. For example, as discussed herein, the thrust augmentation stage 18 may include one or more engines 54, with at least a subset of such engines providing thrust both for launching the launch vehicle during the initial portion of the launch trajectory and during a controlled descent 29 of the thrust augmentation stage 18 back to Earth, as schematically and optionally represented in FIG. 2. The controlled descent 29 additionally or alternatively may be described as a controlled landing 29. By a controlled descent, or landing, it is meant that the thrust augmentation stage 18 may land at a predetermined location, for example, at or near a position from which the launch vehicle was initially launched, as discussed in more detail herein. Additionally or alternatively, controlled landing may mean that the descent and landing of the thrust augmentation stage does not result in significant damage to the thrust augmentation stage and/or does not result in significant cost to retrieve and/or reuse the thrust augmentation stage.

As illustrative, non-exclusive examples, a thrust augmentation stage 18 may include four, six, eight, ten, or more than ten even-numbered engines, with all of the engines being used during the initial portion of the launch and with only a subset (e.g., one-half) of the engines being used for the controlled descent 29. Moreover, the subset of the engines used for the controlled descent may be evenly spaced around the longitudinal axis 31 of the thrust augmentation stage, so as to have a thrust vector that is aligned with the center of mass of the thrust augmentation stage.

As schematically illustrated in FIG. 1, some systems 10 also may include a land-based landing structure 30 that is configured to selectively mate with the thrust augmentation stage 18 following a launch, that is, when the thrust augmentation stage returns to Earth, for example, in systems 10 in which the thrust augmentation stage is configured to be retrieved and reused following a launch.

Similarly, in such embodiments, the thrust augmentation stage 18 is configured to mate with the landing structure 30 following a launch when the thrust augmentation stage returns to Earth. In some embodiments, the thrust augmentation stage 18 may include a plurality of shear cones 32 positioned at the aft of the thrust augmentation stage, and the landing structure 30 may include a plurality of pins 34 that are configured to mate with the plurality of shear cones 32, as schematically illustrated in FIG. 1. Other mating structures also are within the scope of the present disclosure and may be incorporated into landing structures 30 and thrust augmentation stages 18.

In some embodiments, the thrust augmentation stage 18 may include a body 36 that defines a central bore 38, with the first stage 20 extending through the central bore when the thrust augmentation stage and the first stage are operatively coupled together for launch to define a launch vehicle 12, as schematically illustrated in FIG. 1. In some such embodiments, the central bore 38 may be coaxial with the longitudinal axis of the launch vehicle 12. Additionally or alternatively, the launch vehicle 12, the thrust augmentation stage 18, and the first stage 20 may share a longitudinal axis 31, at least when the thrust augmentation stage and the first stage are operatively coupled together. Stated differently, the longitudinal axis of the thrust augmentation stage may be coaxial with the longitudinal axis of the first stage when the thrust augmentation stage and the first stage are operatively coupled together for launch of the launch vehicle and during the initial portion of a launch trajectory.

In some embodiments, the central bore 38 may extend completely through the thrust augmentation stage 18, as schematically represented in FIG. 1. Accordingly, when the first stage 20 is operatively coupled to the thrust augmentation stage 18, the first stage 20 may extend through, and, in some embodiments, completely through, the central bore 38 of the thrust augmentation stage 18. Additionally or alternatively, the first stage 20 may be accessible via the central bore from the aft side of the thrust augmentation stage.

In some embodiments, and as schematically represented in FIG. 1, the thrust augmentation stage and the first stage may collectively define a guide track 40 at an interface between the thrust augmentation stage 18 and the first stage 20 when they are operatively coupled together. When present, the guide track 40 may be configured to operatively constrain movement of the first stage 20 relative to the thrust augmentation stage 18 to longitudinal translation when the first stage is being coupled to and decoupled from the thrust augmentation stage. In other words, the guide track 40 may restrict relative rotational movement between the thrust augmentation stage and the first stage and may provide for a guided longitudinal coupling of the first stage to the thrust augmentation stage when they are being coupled together and for a guided longitudinal uncoupling of the first stage from the thrust augmentation stage when they are being decoupled.

Various configurations of optional guide tracks 40 are within the scope of the present disclosure. As an illustrative, non-exclusive example, a guide track may include a plurality of channels 42 and a plurality of corresponding rails 44 that are configured to longitudinally translate within the plurality of channels. For example, the thrust augmentation stage may include or define a plurality of channels, and the first stage may include or define a plurality of rails corresponding to the plurality of channels.

Additionally or alternatively, the thrust augmentation stage may include or define a plurality of rails, and the first stage may include or define a plurality of channels corresponding to the plurality of rails. In some embodiments, the optional rails may include rollers 46 configured to longitudinally roll within corresponding channels. In some such embodiments, the rollers may be spring biased toward the corresponding channels, for example, to facilitate desired tolerances of fit between the thrust augmentation stage and the first stage when they are coupled together, as well as when they are being coupled together and when they are being decoupled from each other. As illustrative, non-exclusive examples, a guide track 40 may include three, four, or more than four sets of channels 42 and corresponding rails 44.

Additionally or alternatively, as also schematically represented in FIG. 1, the launch vehicle 12 may include a coupling mechanism 48 that is configured to selectively and operatively couple together the thrust augmentation stage 18 and the first stage 20 for launch of the launch vehicle and to selectively and operatively decouple the thrust augmentation stage from the first stage during launch. In some embodiments, although not required, the coupling mechanism 48 may be associated with the guide track 40. Illustrative, non-exclusive examples of coupling mechanisms 48 may include explosive bolts and/or separation nuts. The coupling mechanism 48 also may include a latch mechanism operable to prevent longitudinal movement of the first stage relative to the thrust augmentation stage when the first stage is operatively coupled to the thrust augmentation stage.

In some embodiments, the thrust augmentation stage 18 may include interface heat shielding structure 50 at the interface between the thrust augmentation stage and the first stage 20 when they are operatively coupled together. When present, this interface heat shielding structure 50 is configured to protect the thrust augmentation stage from heat generated by the first stage to which the thrust augmentation stage may be exposed during separation of the thrust augmentation stage and the first stage and/or during a launch. In embodiments in which the thrust augmentation stage defines a central bore 38, interface heat shielding structure 50 may line the central bore. In some such embodiments, the interface heat shielding structure may completely line or may substantially line the central bore. Illustrative, non-exclusive examples of interface heat shielding structure 50 of a thrust augmentation stage 18 include (but are not limited to) high-temperature reusable surface insulation, fibrous refractory composite insulation, toughened unipiece fibrous insulation, low-temperature reusable surface insulation, flexible insulation blankets, advanced flexible reusable insulation, reinforced carbon-carbon, and/or flame-resistant meta-aramid material.

In some embodiments, the thrust augmentation stage 18 additionally or alternatively may include aft heat shielding structure 52. The aft heat shielding structure 52 may be arranged at an aft portion of the thrust augmentation stage 18. When present, the aft heat shielding structure 52 may be configured to protect the thrust augmentation stage from heat generated by the thrust augmentation stage, such as associated with one or more combustion based engines of the thrust augmentation stage. Additionally or alternatively, the aft heat shielding structure 52 may be configured to protect the thrust augmentation stage from heat generated by the first stage, such as associated with one or more combustion based engines of the first stage, for example, when the thrust augmentation stage and the first stage are coupled together during the initial portion of a launch trajectory. Similar to interface heat shielding structure 50, the aft heat shielding structure 52 may include (but is not limited to) high-temperature reusable surface insulation, fibrous refractory composite insulation, toughened unipiece fibrous insulation, low-temperature reusable surface insulation, flexible insulation blankets, advanced flexible reusable insulation, reinforced carbon-carbon, flame-resistant meta-aramid material, or combinations thereof.

In embodiments that include both interface heat shielding structure 50 and aft heat shielding structure 52, the aft heat shielding structure 52 may be more robust than the interface heat shielding structure 50. Additionally or alternatively, the aft heat shielding structure 52 may be configured to withstand elevated temperatures for a longer period of time than the interface heat shielding structure 50. For example, during the initial portion of a launch trajectory, the aft heat shielding structure 52 may be exposed to significant elevated temperatures from the thrust augmentation stage and first stage combustion based engines, while the interface heat shielding structure 50 may be exposed to significant elevated temperatures for a short duration, for example, only during operative separation of the first stage from the thrust augmentation stage following the initial portion of the launch trajectory.

As schematically represented in FIG. 1, a thrust augmentation stage 18 of a launch vehicle 12 may include one or more engines 54 that are configured to selectively provide thrust for at least the initial portion 21 of a launch trajectory 24 and optionally also during a controlled descent 29 and landing of the thrust augmentation stage. Any suitable number of engines 54 may be provided depending on the overall desired configuration of a system 10. As illustrative, non-exclusive examples, a thrust augmentation stage 18 may include six or more engines evenly spaced around the aft end of the thrust augmentation stage.

As also schematically represented in FIG. 1, a first stage 20 of a launch vehicle 12 may include one or more engines 56 that are configured to provide thrust during both the initial portion 21 and the second portion 26 of the launch trajectory. Any suitable configuration of engines 54 and engines 56 may be utilized, including (but not limited to) combustion based engines. As illustrative, non-exclusive examples, engines 54 and engines 56 may be powered by a liquid fuel.

In some embodiments, the thrust augmentation stage 18 may include a liquid fuel tank 58 for holding a volume of liquid fuel 60, as schematically represented in FIG. 1, with the liquid fuel tank being operatively coupled to the engine(s) 54. Illustrative, non-exclusive examples of suitable liquid fuels include Rocket Propellant-1 (RP-1, kerosene), liquid hydrogen, liquid methane, and mono-methyl hydrazine; however, any suitable fuel may be used. Additionally, as also schematically and optionally represented in FIG. 1, the thrust augmentation stage also may include a liquid oxygen tank 62 for holding a volume of liquid oxygen 64, with the liquid oxygen tank also being operatively coupled to the engine(s) 54. Additionally or alternatively, in examples of engines that utilize mono-methyl hydrazine as a liquid fuel, tank 62 may hold a volume of nitrogen tetroxide. An illustrative, non-exclusive example of a suitable engine 54 includes (but is not limited to) the RS-27A engine used on first stage Delta II rockets.

In systems 10 that include a thrust augmentation stage 18 that is configured to be retrieved and reused following a launch, such a system 10 also may include a control system 66 that is configured, or programmed, to control a controlled descent 29 of the thrust augmentation stage to Earth following the initial portion 21 of the launch trajectory 24. In some such embodiments, the control system 66 may be configured to automatically control the controlled descent. By automatically control the controlled descent, it is meant that the control system may be programmed to automatically control the controlled descent without active and/or real-time input from a user, such as from a user that pilots, or otherwise actively steers, directs, and/or controls the controlled descent via real-time human input. Additionally or alternatively, the control system may be configured to actively control the controlled descent 29. By actively control the controlled descent, it is meant that the control system may be configured to react to the various conditions sensed and/or detected by the control system and actively account for such various conditions with instructions sent to the thrust augmentation stage for controlling the controlled descent, whether such instructions are or are not the direct result of real-time human input.

In some embodiments, the optional control system 66 may include a land-based communication device 68 and a thrust augmentation stage communication device 70. The thrust augmentation stage communication device 70 may be located onboard the thrust augmentation stage 18. The land-based communication device 68 may be configured to selectively and/or wirelessly send operational instructions to the thrust augmentation stage communication device 70 to control the controlled descent of the thrust augmentation stage.

In some embodiments, the control system may include one or more sensors 72 that are configured to sense conditions associated with the thrust augmentation stage during a controlled descent of the thrust augmentation stage and to utilize the sensed conditions to control the controlled descent. The one or more sensors 72 may be located onboard the thrust augmentation stage 18 and may be configured to sense such illustrative, non-exclusive conditions as environmental conditions such as wind speed, as well as positional conditions such as velocity, acceleration, and location such as that may be sensed with a global positioning satellite (GPS) system. The control system may utilize such information to facilitate a controlled descent of the thrust augmentation stage.

Additionally or alternatively, the control system may include one or more detectors 74 that are configured to detect a current location of the thrust augmentation stage during a controlled descent and to utilize the detected location to control the controlled descent. For example, such detectors 74 may be land-based and include such systems as radar systems.

Collectively, one or more of the thrust augmentation stage communication device 70, the land-based communication device 68, the sensors 72, and the detectors 74 may be described as an avionics system 71 of the control system 66. Control systems 66 also may include one or more force control mechanisms, or systems, 75 that operatively provide controlling forces to the thrust augmentation stage during its controlled descent. For example, the engines 54 of the thrust augmentation stage may be gimbaled and controlled to effectuate changes in the thrust vector associated with the engines during a controlled descent, with this schematically represented in FIG. 1 with the force control mechanism 75 illustrated in an overlapping relationship with an engine 54. Additionally or alternatively, a force control mechanism 75 may include one or more aerodynamic flaps that are operatively controlled to apply aerodynamic moments on the thrust augmentation stage. Additionally or alternatively, a force control mechanism 75 may include one or more auxiliary engines that are separate and apart from the primary thrust engines 54 and that may be controlled to facilitate the controlled descent of the thrust augmentation stage. Other configurations and implementation of force control mechanisms 75 also are within the scope of the present disclosure.

In some embodiments, the control system may be configured to control the controlled descent 29 of the thrust augmentation stage to Earth following the initial portion 21 of the launch trajectory 24 to within a threshold distance from a position from which the launch vehicle is launched. Illustrative, non-exclusive examples of such a threshold include distances of 1000, 500, 100, 10, and 1 meters. In other words, following the initial portion of a launch trajectory, the thrust augmentation stage may be controlled to return to the location from which it was initially launched with the first stage as part of the launch vehicle. In such systems 10, the thrust augmentation stage may be described as a short-range thrust augmentation stage, because the thrust augmentation stage returns to Earth at least within the vicinity of the position from which the launch vehicle was launched, as opposed to a long-range system with an augmentation stage returning to Earth a significant distance from the position from which the launch vehicle was launched and thus requiring transportation of the augmentation stage over a significant distance.

In some such systems 10, a system may be described as including a launch facility 76, from which the launch vehicle is launched, and the control system 66 may be configured to control the controlled descent 29 of the thrust augmentation stage to the launch facility following the initial portion 21 of the launch trajectory 24. For example, the launch facility may include a launch pad 78, from which the launch vehicle is launched, and optional landing structure 30 may be within a threshold distance of the launch pad. Illustrative, non-exclusive examples of such a threshold include distances of 1000, 500, 100, 10, and 1 meters. Additionally or alternatively, the control system may be configured to control the controlled descent of the thrust augmentation stage directly to the launch pad itself. Additionally or alternatively, in some embodiments, the optional landing structure 30 may be placed a distance away from the launch pad, such as within one of the aforementioned threshold distances, for mating with the thrust augmentation stage when landing, and then following the landing, the landing structure optionally may be used to support the thrust augmentation stage for transportation back to the launch pad for use with a subsequent launch of a launch vehicle.

FIG. 3 schematically provides a flowchart that represents illustrative, non-exclusive examples of methods 200 for launching space vehicles into outer space. Methods 200 may correspond with one or more examples of systems 10 according to the present disclosure. Accordingly, the following discussion makes reference to the various discussed, including optional, components of systems 10; however, not all systems 10 necessarily correspond to a method 200, and methods 200 as discussed herein do not limit systems 10 to the discussed methods and associated steps.

With reference also to FIG. 2, methods 200 include powering a thrust augmentation stage 18 of a launch vehicle 12 during at least an initial portion 21 of a launch trajectory 24 to provide thrust to the launch vehicle, as schematically indicated at 202 in FIG. 3. Methods 200 also include, following the initial portion of the launch trajectory, separating a first stage 20 from the thrust augmentation stage 18, as schematically indicated at 204. Methods 200 also include powering the first stage 20 of the launch vehicle during the initial portion 21 and a second portion 26 of the launch trajectory to provide thrust to the launch vehicle, as schematically indicated at 206 in FIG. 3.

As schematically indicated at 208 in FIG. 3, methods 200 also include separating the space vehicle 14 from the launch vehicle 12 and placing the space vehicle 14 into outer space. Depending on the number of stages 16 that a launch vehicle includes, the space vehicle may be separated from the first stage 20 or from a second or subsequent stage.

Methods 200 also include controlling a controlled descent 29 of the thrust augmentation stage 18 to Earth 28 following the initial portion 21 of the launch trajectory 24, as schematically indicated at 210 in FIG. 3.

Methods 200 also include retrieving and reusing the thrust augmentation stage 18 with a distinct first stage 20 to define a distinct launch vehicle 12 for subsequent launch of a distinct space vehicle 14 into outer space, as schematically indicated at 212 in FIG. 3. Further optional steps may include recharging or refueling the thrust augmentation stage 18 for use with another launch vehicle.

Turning now to FIGS. 4-8, illustrative non-exclusive examples of component parts of a system 10 are illustrated. Where appropriate, the reference numerals from the schematic illustrations of FIGS. 1-2 are used to designate corresponding parts of the examples; however, the examples of FIGS. 4-8 are non-exclusive and do not limit systems 10 to the illustrated embodiments of FIGS. 4-8. That is, systems 10 are not limited to the specific embodiments of FIGS. 4-8, and systems 10 may incorporate any number of the various aspects, configurations, characteristics, properties, etc. of systems 10 that are illustrated in and discussed with reference to the schematic representations of FIGS. 1-2 and/or the embodiments of FIGS. 4-8, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the examples of FIGS. 4-8; however, it is within the scope of the present disclosure that the previously discussed features, variants, etc. may be utilized with these examples.

FIGS. 4-7 illustrate an example launch vehicle 12, indicated generally at 112. As illustrated, launch vehicle 112 is an example of a launch vehicle that includes four stages 16, including a thrust augmentation stage 18, a first stage 20, a second stage 22, and a third stage 23 that supports a space vehicle 14. The thrust augmentation stage of launch vehicle 112 is identified herein as thrust augmentation stage 118. The first stage, the second stage, and the third stage of launch vehicle 112 are identified herein as the main, or primary, stages 116.

Figure 4:
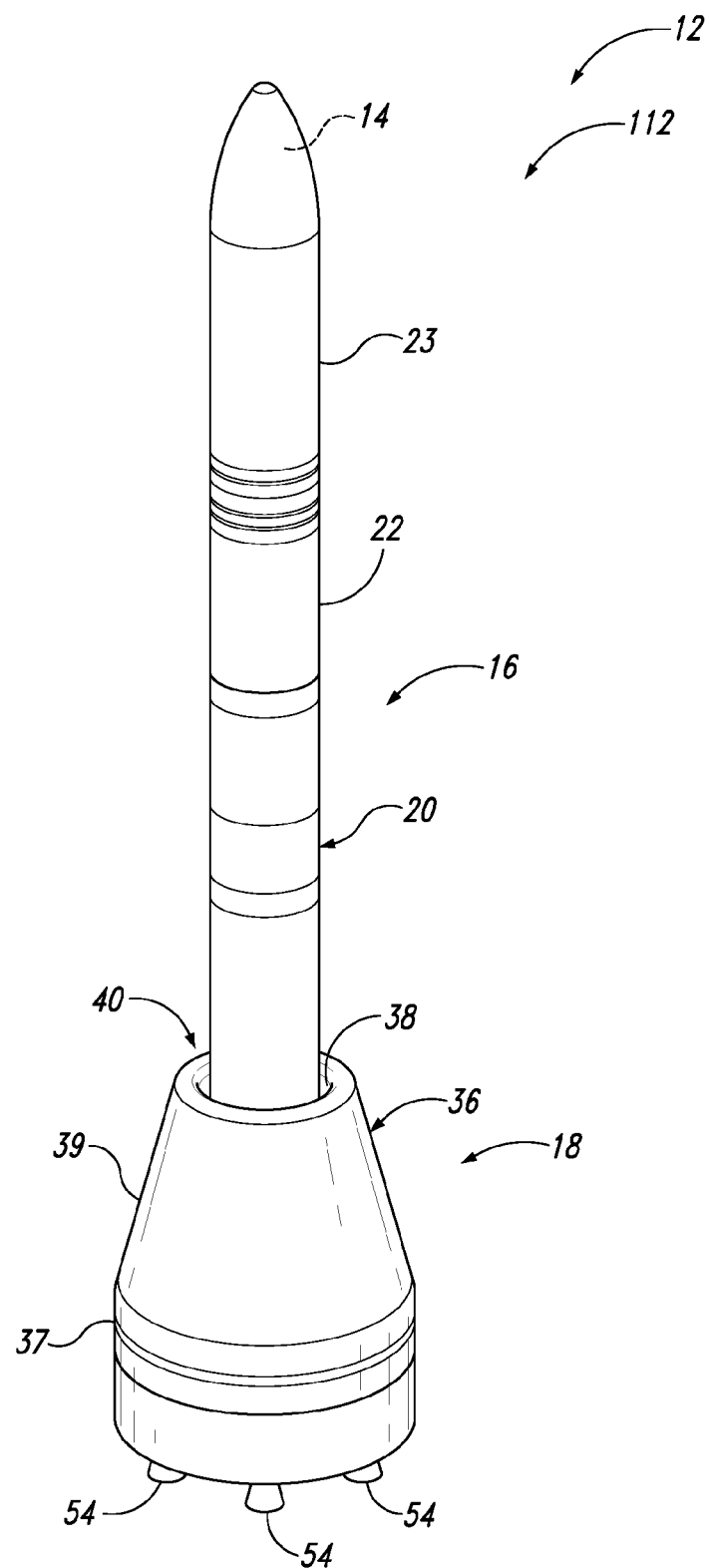
FIG. 4 is a perspective view of an illustrative, non-exclusive example of a launch vehicle of a multi-stage launch system.

The thrust augmentation stage 118 of launch vehicle 112 is an example of a thrust augmentation stage 18 that defines a central bore 38, with the first stage 20 extending through the central bore when the thrust augmentation stage and the first stage are operatively coupled together for launch, as illustrated in FIG. 4. The thrust augmentation stage 118 may include a body 36 which may be aerodynamically shaped to reduce drag during launch and/or the initial portion of the launch trajectory. The body 36 may include a first portion 37 which may define a first fuel tank (e.g., a liquid fuel tank 58 which may contain a liquid fuel 60, such as RP-1) and a second portion 39 which may define a second fuel tank (e.g., a liquid oxygen tank 62, which may contain liquid oxygen 64).

Figure 5:
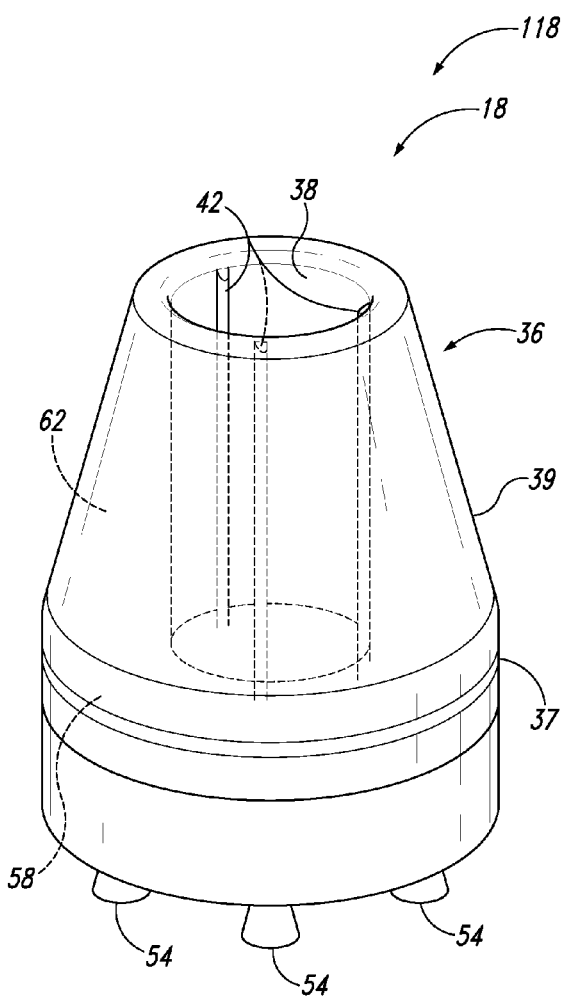
FIG. 5 is a perspective view of the thrust augmentation stage of the launch vehicle of FIG. 4.
Figure 6:
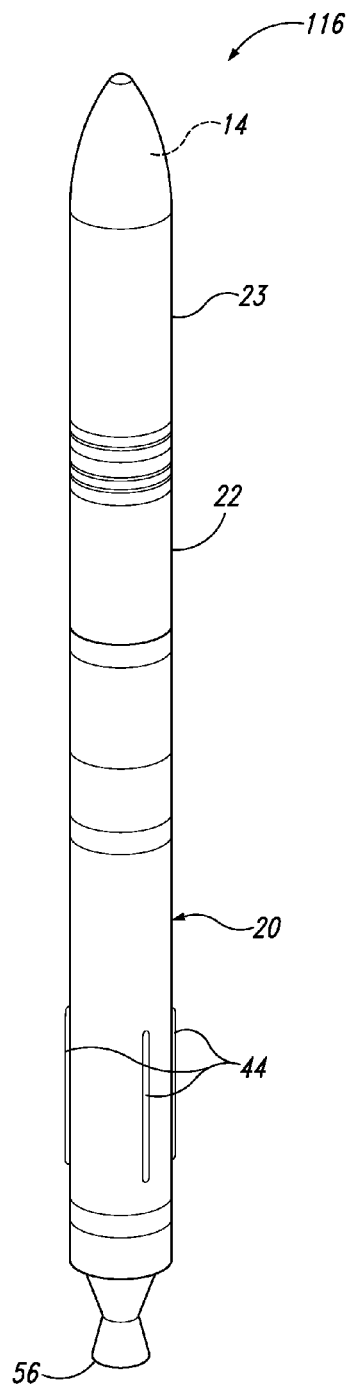
FIG. 6 is a perspective view of the assembly of the first, second, and third stages of the launch vehicle of FIG. 4.

Moreover, launch vehicle 112 is an example of a launch vehicle in which the thrust augmentation stage and the first stage collectively define a guide track 40 at an interface between the thrust augmentation stage and first stage. In the illustrated example, the thrust augmentation stage 118 includes three channels 42, as seen in FIG. 5, and the first stage includes three corresponding rails 44, as seen in FIG. 6.

Figure 7:
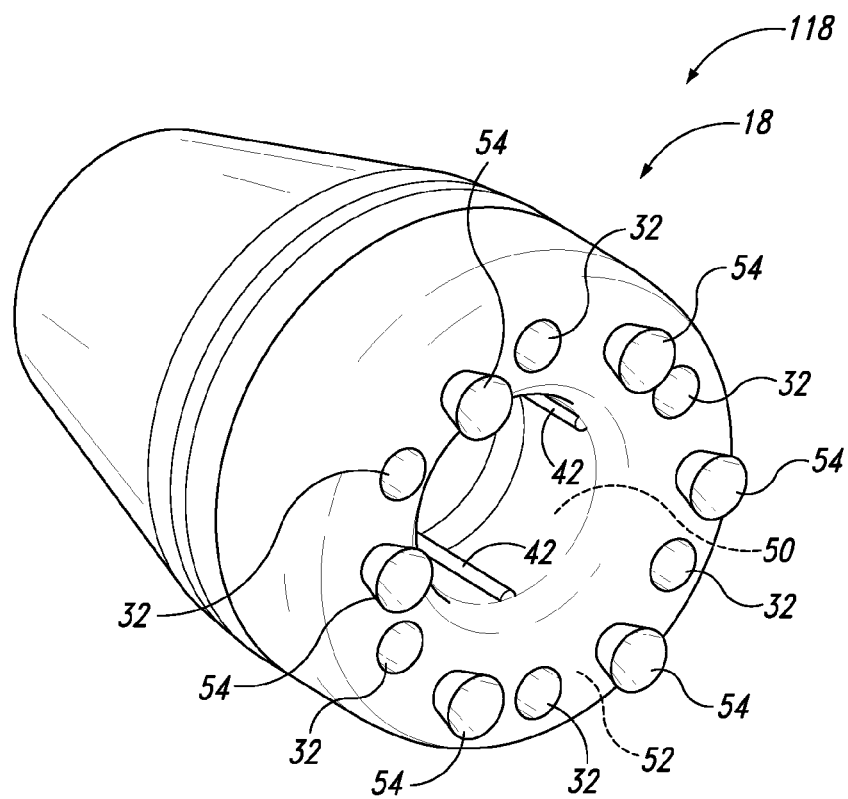
FIG. 7 is another perspective view of the thrust augmentation stage of the launch vehicle of FIG. 4.
Figure 8:
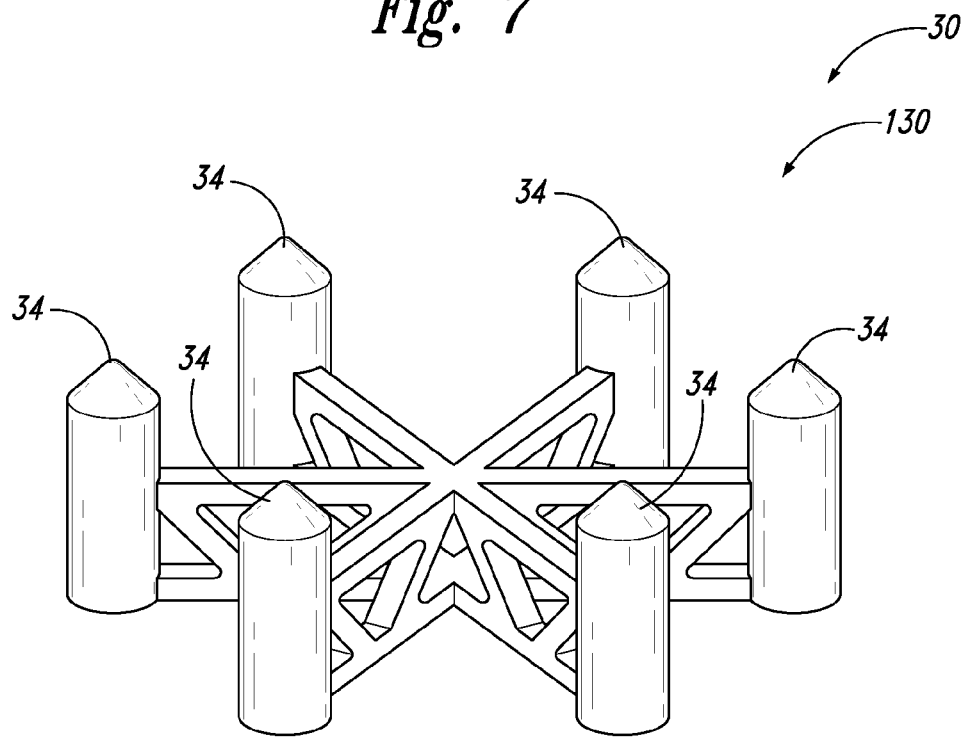
FIG. 8 is a perspective view of an illustrative, non-exclusive example of landing structure for use with the thrust augmentation stage of the launch vehicle of FIG. 4.

The thrust augmentation stage 118 of launch vehicle 112 also is an example of a thrust augmentation stage that includes a plurality of shear cones 32 positioned at the aft of the thrust augmentation stage, as illustrated in FIG. 7. More specifically, the example thrust augmentation stage includes six shear cones evenly spaced about the aft of the thrust augmentation stage interspaced with six engines 54. FIG. 8 illustrates an illustrative, non-exclusive example of corresponding landing structure 30 that is configured to mate with the shear cones of the thrust augmentation stage following a launch of the launch vehicle 112. The example landing structure, identified as landing structure 130, includes six pins 34 that are positioned and sized to mate with the shear cones. Accordingly, a control system 66 of a system 10 may control a controlled descent of the thrust augmentation stage 118 so that it lands on and mates with the example landing structure 130.

Illustrative, non-exclusive examples of inventive subject matter according to the present disclosure are described in the following enumerated paragraphs:

A. A multi-stage space launch system for launching a space vehicle into outer space, the system comprising:
- a launch vehicle configured to operatively support a space vehicle for placement in outer space, wherein the launch vehicle includes at least two stages including:
  - a thrust augmentation stage configured to provide thrust for an initial portion of a launch trajectory; and
  - a first stage configured to be selectively coupled to and decoupled from the thrust augmentation stage and further configured to provide thrust during the initial portion and during a second portion of the launch trajectory following the initial portion of the launch trajectory.

A1. The system of paragraph A, wherein the thrust augmentation stage is configured to be selectively decoupled from the first stage during the launch trajectory and subsequently to be retrieved and reused following a launch of the launch vehicle.

A2. The system of any of paragraphs A-A1, wherein the thrust augmentation stage is configured to be selectively decoupled from the first stage during the launch trajectory.

A2.1. The system of paragraph A2, wherein the thrust augmentation stage is further configured to be subsequently retrieved and reused with a distinct first stage to define a distinct launch vehicle for a subsequent launch of a distinct space vehicle into outer space.

A2.2. The system of any of paragraphs A2-A2.1, wherein the thrust augmentation stage is further configured for controlled landing following separation from the first stage.

A3. The system of any of paragraphs A-A2.2, wherein the thrust augmentation stage is configured to land on Earth following a launch, optionally without significant damage to the thrust augmentation stage.

A4. The system of any of paragraphs A-A3, wherein the thrust augmentation stage is configured to land on Earth with the same orientation as was launched, optionally vertically, following a launch.

A5. The system of any of paragraphs A-A4, wherein the thrust augmentation stage is configured to utilize the same source of thrust that is used during the initial portion of the launch trajectory to return to and land on Earth.

A6. The system of any of paragraphs A1-A5, further comprising:
- a land-based landing structure configured to selectively mate with the thrust augmentation stage following a launch when the thrust augmentation stage returns to Earth;
- wherein the thrust augmentation stage is configured to mate with the landing structure following a launch when the thrust augmentation stage returns to Earth.

A6.1. The system of paragraph A6,
- wherein the thrust augmentation stage includes a plurality of shear cones positioned at an aft portion of the thrust augmentation stage; and
- wherein the landing structure includes a plurality of pins configured to mate with the plurality of shear cones.

A7. The system of any of paragraphs A-A6.1, wherein the thrust augmentation stage includes a body that defines a central bore, and wherein the first stage extends through the central bore for launch.

A7.1. The system of paragraph A7, wherein the launch vehicle has a longitudinal axis, and wherein the central bore is coaxial with the longitudinal axis.

A7.2. The system of any of paragraphs A7-A7.1, wherein the central bore extends completely through the thrust augmentation stage.

A8. The system of any of paragraphs A-A7.2, wherein the thrust augmentation stage and the first stage collectively define a guide track at an interface between the thrust augmentation stage and the first stage when the thrust augmentation stage and the first stage are operatively coupled together, wherein the guide track is configured to operatively constrain longitudinal translation of the first stage relative to the thrust augmentation stage when the first stage is being decoupled from the thrust augmentation stage during launch.

A8.1. The system of paragraph A8, wherein the guide track includes at least one channel and at least one rail configured to longitudinally translate within the at least one channel.

A8.1.1. The system of paragraph A8.1, wherein one of the thrust augmentation stage and the first stage includes the at least one channel and the other of the thrust augmentation stage and the first stage includes the at least one rail.

A8.1.2. The system of any of paragraphs A8.1-A8.1.1, wherein the rail includes rollers configured to longitudinally roll within the at least one channel.

A8.1.2.1. The system of paragraph A9.1.2, wherein the rollers are spring biased toward the at least one channel.

A9. The system of any of paragraphs A-A8.1.2.1, wherein the launch vehicle includes a coupling mechanism configured to selectively and operatively couple together the thrust augmentation stage and the first stage for launch of the launch vehicle, wherein the coupling mechanism is further configured to selectively and operatively decouple the thrust augmentation stage from the first stage during the launch trajectory.

A9.1. The system of paragraph A9, wherein the coupling mechanism includes explosive bolts.

A9.2. The system of any of paragraphs A9-A9.1, wherein the coupling mechanism includes separation nuts.

A10. The system of any of paragraphs A-A9.2, wherein the thrust augmentation stage includes interface heat shielding structure at an interface between the thrust augmentation stage and the first stage, wherein the interface heat shielding structure is configured to protect the thrust augmentation stage from heat associated with the first stage during separation of the thrust augmentation stage and the first stage during launch of the launch vehicle.

A10.1 The system of paragraph A10, wherein the interface heat shielding structure includes one or more of high-temperature reusable surface insulation, fibrous refractory composite insulation, toughened unipiece fibrous insulation, low-temperature reusable surface insulation, flexible insulation blankets, advanced flexible reusable insulation, reinforced carbon-carbon, and flame-resistant meta-aramid material.

A11. The system of any of paragraphs A-A10.1, wherein the thrust augmentation stage includes aft heat shielding structure at the aft of the thrust augmentation stage, wherein the aft heat shielding structure is configured to protect the thrust augmentation stage from heat generated by the thrust augmentation stage and from heat generated by the first stage during launch of the launch vehicle.

A11.1. The system of paragraph A11 when depending from paragraph A10, wherein the aft heat shielding structure is more robust than the interface heat shielding structure.

A11.2. The system of any of paragraphs A11-A11.1 when depending from paragraph A10, wherein the aft heat shielding structure is configured to withstand elevated temperatures for a longer period of time than the interface heat shielding structure.

AU. The system of any of paragraphs A-A11.2, wherein the thrust augmentation stage is configured to be powered by a liquid fuel.

A13. The system of any of paragraphs A-AU, wherein the thrust augmentation stage includes a liquid fuel tank, optionally further comprising liquid fuel in the liquid fuel tank, optionally wherein the liquid fuel includes Rocket Propellant-1 (RP-1).

A14. The system of any of paragraphs A-A13, wherein the thrust augmentation stage includes a liquid oxygen tank, optionally further comprising liquid oxygen in the liquid oxygen tank.

A15. The system of any of paragraphs A-A14, wherein the thrust augmentation stage includes one or more engines configured to be powered by a liquid fuel and to provide thrust for launching the space vehicle during at least the initial portion of the launch trajectory, and optionally during a controlled descent of the thrust augmentation stage to Earth following the initial portion of the launch trajectory.

A16. The system of any of paragraphs A-A15, further comprising:
  a control system configured, or programmed, to control a controlled descent of the thrust augmentation stage to Earth following the initial portion of the launch trajectory.

A16.1. The system of paragraph A16, wherein the control system is configured to automatically control the controlled descent.

A16.2. The system of any of paragraphs A16-A16.1, wherein the control system is configured to actively control the controlled descent.

A16.3. The system of any of paragraphs A16-A16.2, wherein control system includes a land-based communication device and a thrust augmentation stage communication device, and wherein the land-based communication device is configured to selectively send operational instructions to the thrust augmentation stage communication device to control the controlled descent of the thrust augmentation stage.

A16.4. The system of any of paragraphs A16-A16.3, wherein the control system includes one or more sensors configured to sense environmental conditions associated with the thrust augmentation stage during the controlled descent, and wherein the control system is configured to utilize the environmental conditions to control the controlled descent.

A16.5. The system of any of paragraphs A16-A16.4, wherein the control system includes one or more detectors configured to actively detect a detected location of the thrust augmentation stage during the controlled descent, and wherein the control system is configured to utilize the detected location of the thrust augmentation stage to control the controlled descent.

A16.6. The system of any of paragraphs A16-A16.5, further comprising:
  a launch facility, from which the launch vehicle is configured to launch;
  wherein the control system is configured to control the controlled descent of the thrust augmentation stage to the launch facility following the initial portion of the launch trajectory.

A16.6.1. The system of paragraph A16.6 when depending from paragraph A6, wherein the launch facility includes a launch pad, from which the launch vehicle is configured to launch, and wherein the landing structure is within 1000 meters, 500 meters, 100 meters, 10 meters, or 1 meter of the launch pad, optionally wherein the launch pad includes the landing structure.

A16.7. The system of any of paragraphs A16-A16.6.1, wherein the control system is configured to control the controlled descent of the thrust augmentation stage to Earth following the initial portion of the launch trajectory to within 1000 meters, 500 meters, 100 meters, 10 meters, or 1 meter from a position from which the launch vehicle is launched.

A17. The system of any of paragraphs A-A16.7,
  wherein the first stage is configured to be used only once as a component of a launch vehicle;
  wherein the first stage is not configured to be reused following a launch of the launch vehicle; and/or
  wherein the first stage is configured to not be reused following a launch of the launch vehicle.

A18. The system of any of paragraphs A-A17, further comprising the space vehicle, wherein the space vehicle is supported by the launch vehicle.

A19. The system of any of paragraphs A-A18, wherein the first stage is decoupled from the thrust augmentation stage, wherein the first stage is along the second portion of the launch trajectory, and wherein the thrust augmentation stage is being controlled in a controlled descent to Earth.

A20. The use the system of any of paragraphs A-A19 to place a space vehicle into outer space.

B. A method of launching a space vehicle into outer space, the method comprising:
  powering a thrust augmentation stage of a launch vehicle during an initial portion of a launch trajectory to provide thrust to the launch vehicle;
  following the initial portion of the launch trajectory, separating a first stage of the launch vehicle from the thrust augmentation stage;
  powering the first stage of the launch vehicle during the initial portion and during a second portion of the launch trajectory following the initial portion of the launch trajectory to provide thrust to the launch vehicle; and
  controlling a controlled descent of the thrust augmentation stage to Earth following separation of the thrust augmentation stage from the first stage.

B1. The method of paragraph B, further comprising:
  separating the space vehicle from the launch vehicle and placing the space vehicle into outer space.

B2. The method of any of paragraphs B-B1, further comprising:
  retrieving and reusing the thrust augmentation stage with a distinct first stage to define a distinct launch vehicle for a subsequent launch of a distinct space vehicle into outer space.

B3. The method of any of paragraphs B-B2, wherein the first stage provides thrust to the launch vehicle during the separating.

B3.1. The method of paragraph B3, wherein exhaust from the first stage directly engages the thrust augmentation stage during the separating.

B4. The method of any of paragraphs B-B3.1, wherein the thrust augmentation stage and the first stage of the launch vehicle are lit on the ground and both provide thrust for initial launch of the launch vehicle.

B5. The method of any of paragraphs B-B4, utilizing the system of any of paragraphs A-A19.

As used herein, the terms "selective" and "selectively," when modifying an action, movement, configuration, or other activity of one or more components or characteristics of an apparatus, mean that the specific action, movement, configuration, or other activity is intended and/or is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of launching a space vehicle into outer space, the method comprising:
   powering a thrust augmentation stage of a launch vehicle during an initial portion of a launch trajectory to provide thrust to the launch vehicle, wherein the initial portion has a maximum elevation of 10 kilometers;
   following the initial portion of the launch trajectory, separating a first stage of the launch vehicle from the thrust augmentation stage;
   powering the first stage during the initial portion and a second portion of the launch trajectory following the initial portion to provide thrust to the launch vehicle; and
   controlling a controlled descent of the thrust augmentation stage to Earth following separation of the thrust augmentation stage from the first stage.

2. The method of claim 1, further comprising:
   separating the space vehicle from the launch vehicle and placing the space vehicle into outer space.

3. The method of claim 1, further comprising:
   retrieving and reusing the thrust augmentation stage with a distinct first stage to define a distinct launch vehicle for a subsequent launch of a distinct space vehicle into outer space.

4. The method of claim 1, wherein the first stage provides thrust to the launch vehicle during the separating.

5. The method of claim 4, wherein exhaust from the first stage directly engages the thrust augmentation stage during the separating.

6. The method of claim 1, wherein the thrust augmentation stage and the first stage are lit on the ground and both provide thrust for initial launch of the launch vehicle.

7. The method of claim 1, wherein the controlling the controlled descent utilizes the same source of thrust used for the powering the thrust augmentation stage during the initial portion of the launch trajectory.

8. The method of claim 1, wherein the powering the thrust augmentation stage comprises powering the thrust augmentation stage by a liquid fuel.

9. The method of claim 1, wherein the controlling the controlled descent comprises landing the thrust augmentation stage vertically on Earth.

10. The method of claim 1,
    wherein the powering the thrust augmentation stage is initiated at a launch facility to launch the launch vehicle; and
    wherein the controlling the controlled descent comprises returning the thrust augmentation stage to the launch facility.

11. The method of claim 1, wherein the controlling the controlled descent comprises returning the thrust augmentation stage to within 1000 meters from a position from which the launch vehicle was launched.

12. The method of claim 1, wherein the controlling the controlled descent comprises landing the thrust augmentation stage vertically on Earth within 1000 meters from a position from which the launch vehicle was launched.

13. The method of claim 1, wherein the controlling the controlled descent comprises automatically landing the thrust augmentation stage at a predetermined location.

14. The method of claim 1, wherein the controlling the controlled descent comprises actively controlling the controlled descent by reacting to conditions sensed by the thrust augmentation stage, wherein the conditions sensed include wind speed, velocity, acceleration, and location.

15. The method of claim 1, wherein the controlling the controlled descent comprises controlling thrust vectors associated with engines of the thrust augmentation stage.

16. The method of claim 15, wherein the controlling thrust vectors comprises controlling one or more of (i) gimbals associated with primary engines of the thrust augmentation stage, (ii) aerodynamic flaps of the thrust augmentation stage, and (iii) auxiliary engines of the thrust augmentation stage that are separate from the primary engines.

17. The method of claim 1, wherein the separating comprises longitudinally translating at least one rail within at least one channel.

18. The method of claim 1, wherein the separating comprises longitudinally translating the first stage out of a central bore of the thrust augmentation stage.

19. The method of claim 1, wherein the controlling the controlled descent comprises mating a plurality of shear cones of the thrust augmentation stage with a plurality of pins of a land-based landing structure.

20. The method of claim 1, further comprising:
    following the second portion of the launch trajectory, separating a second stage of the launch vehicle from the first stage; and
    powering the second stage during a third portion of the launch trajectory following the initial portion and the second portion of the launch trajectory.

21. A method of launching a space vehicle into outer space, the method comprising:
    powering a thrust augmentation stage of a launch vehicle during an initial portion of a launch trajectory to provide thrust to the launch vehicle;

following the initial portion of the launch trajectory, separating a first stage of the launch vehicle from the thrust augmentation stage;

powering the first stage of the launch vehicle during the initial portion and a second portion of the launch trajectory following the initial portion of the launch trajectory to provide thrust to the launch vehicle, wherein the thrust augmentation stage and the first stage of the launch vehicle are lit on the ground and both provide thrust for initial launch of the launch vehicle during the initial portion; and controlling a controlled descent of the thrust augmentation stage to Earth following separation of the thrust augmentation stage from the first stage.

22. The method of claim 21, further comprising:
separating the space vehicle from the launch vehicle and placing the space vehicle into outer space.

23. The method of claim 21, further comprising:
retrieving and reusing the thrust augmentation stage with a distinct first stage to define a distinct launch vehicle for a subsequent launch of a distinct space vehicle into outer space.

24. The method of claim 21, wherein the first stage provides thrust to the launch vehicle during the separating.

25. The method of claim 24, wherein exhaust from the first stage directly engages the thrust augmentation stage during the separating.

26. The method of claim 21, wherein the controlling the controlled descent utilizes the same source of thrust used for the powering the thrust augmentation stage during the initial portion of the launch trajectory.

27. The method of claim 21, wherein the powering the thrust augmentation stage comprises powering the thrust augmentation stage by a liquid fuel.

28. The method of claim 21, wherein the controlling the controlled descent comprises landing the thrust augmentation stage vertically on Earth.

29. The method of claim 21,
wherein the powering the thrust augmentation stage is initiated at a launch facility to launch the launch vehicle; and
wherein the controlling the controlled descent comprises returning the thrust augmentation stage to the launch facility.

30. The method of claim 21, wherein the controlling the controlled descent comprises returning the thrust augmentation stage to within 1000 meters from a position from which the launch vehicle was launched.

31. The method of claim 21, wherein the controlling the controlled descent comprises landing the thrust augmentation stage vertically on Earth within 1000 meters from a position from which the launch vehicle was launched.

32. The method of claim 21, wherein the controlling the controlled descent comprises automatically landing the thrust augmentation stage at a predetermined location.

33. The method of claim 21, wherein the controlling the controlled descent comprises actively controlling the controlled descent by reacting to conditions sensed by the thrust augmentation stage, wherein the conditions sensed include wind speed, velocity, acceleration, and location.

34. The method of claim 21, wherein the controlling the controlled descent comprises controlling thrust vectors associated with engines of the thrust augmentation stage.

35. The method of claim 34, wherein the controlling thrust vectors comprises controlling one or more of (i) gimbals associated with primary engines of the thrust augmentation stage, (ii) aerodynamic flaps of the thrust augmentation stage, and (iii) auxiliary engines of the thrust augmentation stage that are separate from the primary engines.

36. The method of claim 21, wherein the separating comprises longitudinally translating at least one rail within at least one channel.

37. The method of claim 21, wherein the separating comprises longitudinally translating the first stage out of a central bore of the thrust augmentation stage.

38. The method of claim 21, wherein the controlling the controlled descent comprises mating a plurality of shear cones of the thrust augmentation stage with a plurality of pins of a land-based landing structure.

39. The method of claim 21, further comprising:
following the second portion of the launch trajectory, separating a second stage of the launch vehicle from the first stage; and
powering the second stage during a third portion of the launch trajectory following the initial portion and the second portion of the launch trajectory.

* * * * *